(12) United States Patent
Takamori (10) Patent No.: US 6,252,995 B1
(45) Date of Patent: Jun. 26, 2001

(54) METHOD OF AND APPARATUS FOR ENHANCING IMAGE SHARPNESS

(75) Inventor: Tetsuya Takamori, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/133,403

(22) Filed: Aug. 13, 1998

(30) Foreign Application Priority Data

Aug. 25, 1997 (JP) .................................................... 9-228164
Aug. 25, 1997 (JP) .................................................... 9-228168

(51) Int. Cl.$^7$ ................................ G06T 5/00; G06T 5/50
(52) U.S. Cl. ............................................ 382/254; 328/266
(58) Field of Search .................................... 382/264, 130, 382/132, 266, 205, 261, 263, 254

(56) References Cited

U.S. PATENT DOCUMENTS

| 5,081,692 | * | 1/1992 | Kwon et al. | 382/263 |
| 5,087,972 | * | 2/1992 | Sumi et al. | 382/266 |
| 5,784,488 | * | 7/1998 | Kuwata et al. | 382/176 |
| 5,937,111 | * | 8/1999 | Yamada et al. | 382/132 |

\* cited by examiner

*Primary Examiner*—Scott Rogers
(74) *Attorney, Agent, or Firm*—Sughrue, Mion, Zinn, Macpeak & Seas, PLLC

(57) ABSTRACT

An image region including surface roughness or quantized steps is prevented from being sharpness-enhanced. m×n pixels around an image signal are extracted, and maximum and minimum value signals Smax, Smin are extracted from the m×n pixel data, after which a difference signal Sd (Sd=Smax−Smin) representing the difference between the maximum and minimum value signals Smax, Smin is calculated. If the difference signal Sd is smaller than a threshold th1, then the image signal is judged as being from a region of uniform image density or a region of small density variations, and an enhancement coefficient h is set to h=0. Since an unsharp masking signal h·k(S−U) is zero, a sharpness-enhanced signal S\*\* is equal to S\*\*=S. Therefore, an image signal free of sharpness enhancement is outputted. Because the image signal from the region of uniform image density is not sharpness-enhanced, a granular state and quantized steps will not be subject to sharpness enhancement.

19 Claims, 7 Drawing Sheets

| a11 | a12 | a13 | a14 | a15 | a16 | a17 | a18 | a19 | a110 | a111 | a112 | ... |
|---|---|---|---|---|---|---|---|---|---|---|---|---|
| a21 | | | | | | | | | | | | |
| a31 | | | | | | | | | | | | |
| a41 | | | | | | | | | | | | |
| a51 | | | | a55 | | a57 | | | | | | |
| a61 | | | | | a66 | | | | | | | |
| a71 | | | | a75 | | a77 | | | | | | |
| a81 | | | | | | | | | | | | |
| a91 | | | | | | | | | | | | |
| a101 | | | | | | | | | | | | |
| a111 | | | | | | | | | | | a1111 | |
| a121 | | | | | | | | | | | | |
| ⋮ | | | | | | | | | | | | |

METHOD OF AND APPARATUS FOR ENHANCING IMAGE SHARPNESS

BACKGROUND OF THE INVENTION

1. Field of the Invention

The present invention relates to the art of enhancement of images, and more particularly to a method of and an apparatus for enhancing the sharpness of images generated by scanners in platemaking applications, for example.

2. Detailed Description of the Related Art

Sharpness enhancement has heretofore been employed for improving the sharpness of images in the field of image processing.

According to the conventional sharpness enhancement process, as well known in the art, an image signal is extracted from around an image signal S, whose sharpness is to be enhanced, of a subject (which may be an image-carrying document), with a mask size of n×n pixels, for example, and an arithmetic mean of the extracted image signal is calculated as an unsharp signal U (also called a "local mean signal"). Then, a difference signal S−U (also called an "unsharp masking (USM) signal")between the image signal S and unsharp signal U is calculated, and multiplied by a predetermined coefficient k which normally has a value in the range of from 0 to 1, generating an unsharp masking signal USM.

An image signal (also called a "sharpness-enhanced signal") S* which is sharpness-enhanced is produced according to the following equation (1):

$$S^* = S + USM = S + k \cdot (S-U) \quad (1)$$

The sharpness-enhanced signal S* is then converted into a binary signal, which is converted into a halftone dot image signal. Based on the halftone dot image signal, a halftone dot image is formed on a recording medium such as a film by a scanning process. A printing plate is made on the basis of the recording medium, and then mounted on a printing press to produce a print with halftone dot image formed thereon.

When the above conventional sharpness enhancement process is effected on an image signal, a uniform density region of an image formed from the sharpness-enhanced signal, i.e., an image region where the image density is constant or varies gradually, is enhanced to a granular state. For example, an image on a print which is produced as described above may have a greater surface roughness.

Furthermore, when the above conventional sharpness enhancement process is effected on an image signal, quantized steps of an image signal in a region where the image density varies gradually are enhanced, resulting in stripes like tone jumps on an image on a print which is produced as described above.

One solution would be not to effect the sharpness enhancement process on an image region where the image density varies to the same extent as quantized steps. However, such an approach would be disadvantageous in that a visual surface characteristic, i.e., the texture, of a subject such as a fabric, a skin, a metal, or the like, would also be enhanced, and the image on the print would lose the texture of the subject.

SUMMARY OF THE INVENTION

It is therefore an object of the present invention to provide a method of and an apparatus for enhancing the sharpness of images having small contrast such as of texture without enhancing uniform density regions to a granular state and also without enhancing quantized steps.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
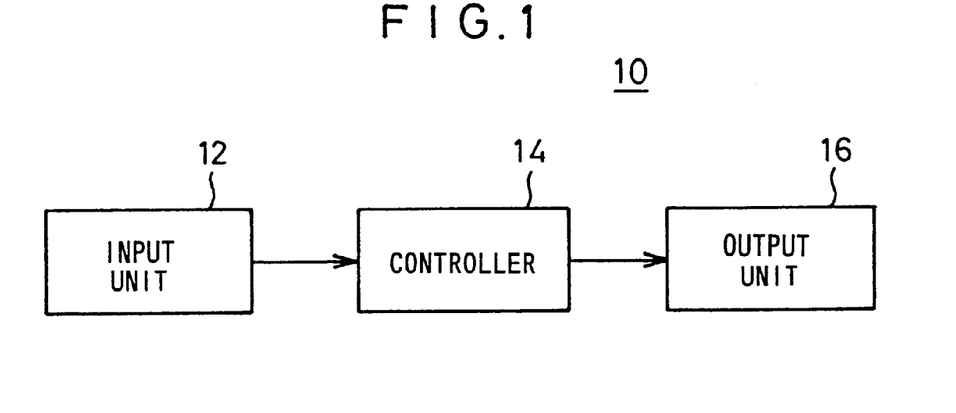
FIG. 1 is a block diagram of a printing scanner as an image scanning, reading, and reproducing system which incorporates the principles of the present invention.

FIG. 1 shows in block form a printing scanner 10 as an image scanning, reading, and reproducing system which incorporates the principles of the present invention.

As shown in FIG. 1, the printing scanner 10 has an input unit 12, a controller 14, and an output unit 16. In the input unit 12, reflected or transmitted light from an image subject which is irradiated with light from a light source (not shown) is color-separated by filters of three primaries, and then applied to a photoelectric transducer such as a CCD linear image sensor or the like. The light applied to the photoelectric transducer is scanned in a main scanning direction therealong, and converted thereby into an electric image signal (pixel signal). At the same time, the image subject is fed in an auxiliary scanning direction perpendicularly to the main scanning direction, so that the photoelectric transducer can scan the light from the image subject two-dimensionally thereby to generate an image signal covering the entire image subject.

The generated image signal is supplied from the input unit 12 to the controller 14, which comprises a computer operating as an A/D converter and a control unit. In the controller 14, the image signal is converted into a digital image signal (pixel signal), and then converted from a luminance image signal into a density image signal, which is subjected to gradation correction, sharpness enhancement, and color correction. The image signal is thereafter converted into a halftone dot image signal and processed according to various image processing methods.

The halftone dot image signal is then supplied to the output unit 16. In the output unit 16, the halftone dot image signal is photoelectrically converted into a light beam such as a laser beam, which is applied to scan a photosensitive film to form a latent image thereon. The latent image on the photosensitive film is then developed by a developing machine, producing a film with a visible image thereon.

A printing plate is made on the basis of the film by a printing plate producing apparatus, and then mounted on a printing press. In the printing press, an ink is transferred from the printing plate to a sheet of paper. As many color inks as the number of the separated colors are transferred from respective printing plates to the sheet of paper, thereby producing a print with a color image formed thereon.

Figure 2:
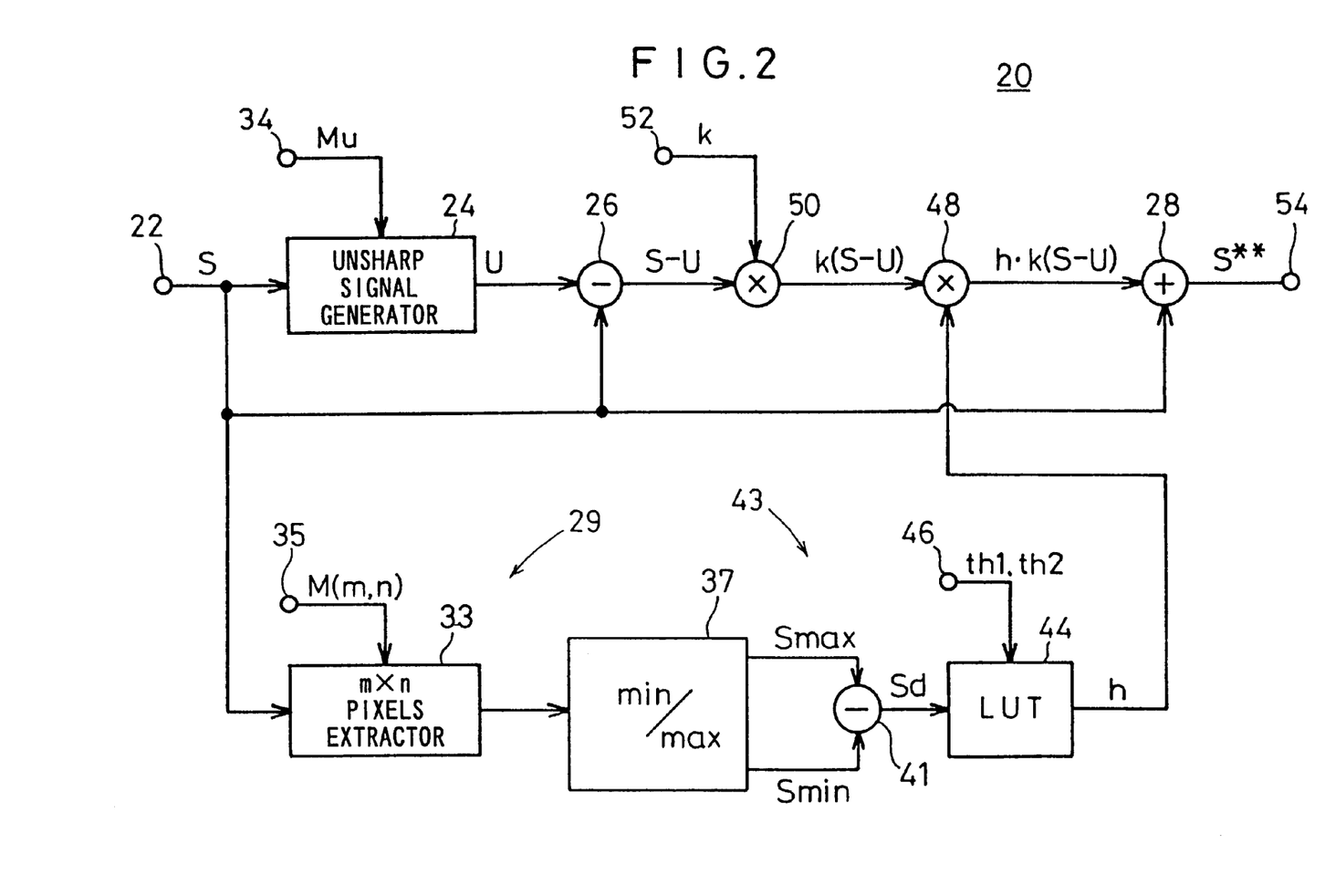
FIG. 2 is a block diagram of a sharpness enhancement processor in a controller of the printing scanner shown in FIG. 1.

FIG. 2 shows in block form a sharpness enhancement processor 20 in the controller 14, which is based on the principles of the present invention. Various processing functions of the sharpness enhancement processor 20 may be performed by either a CPU (not shown) which runs a software program or a hardware arrangement composed of various circuits.

As shown in FIG. 2, an input image signal (pixel signal) S having a resolution of about 10 bits (representing about 1000 gradations) is supplied from an input port 22 to an unsharp signal generator 24, a subtractor (difference signal generator) 26, an adder (sum signal generator) 28, and a pixel extractor 33 for extracting a certain image region composed of m×n pixels from the image signal S. The pixel extractor 33 is also referred to as a region pixel extractor or an m×n pixels extractor.

The unsharp signal generator 24 generates an unsharp signal U from the input image signal S based on a desired blurring mask size Mu supplied from a port 34, and supplies the generated unsharp signal U to the subtractor 26.

The region pixel extractor 33 extracts pixel data of m×n pixels including the image signal S as central pixel data based on a given mask size M(m,n), which covers a range around the image signal S, supplied from a port 35, and supplies the extracted pixel data m×n pixels to a maximum and minimum value extractor 37. The mask size M(m,n) may be a mask size M(m,n) where m=n. In this embodiment, the mask size M(m,n) comprises m×n =11×11 pixels. The mask size M(m,n) may have a different value for each color printing plate in view of the fact that each color printing plate has a different granularity.

As described later on, the image signal S may represent an overall or partial image of the image subject, or may also mean a pixel signal at the center of the mask size Mu or the mask size M(m,n). If the image signal S means the latter, then it is referred to as a pixel signal S. In this embodiment, the pixel signal S is of a square shape and has a size, i.e., a one-dot size, of about 5 $\mu$m along each side. Therefore, the mask size M(m,n) is of 55 $\mu$m along each side of a square shape. The blurring mask size Mu may be of an appropriate value independent of the mask size M(m,n). In this embodiment, the blurring mask size Mu corresponds to 3×3 pixels, i.e., is of 15 $\mu$m along each side of a square shape.

The maximum and minimum value extractor 37 extracts a maximum value signal Smax and a minimum value signal Smin from the supplied pixel data of m×n pixels, and supplies the extracted maximum and minimum value signals Smax, Smin to a subtractor (difference signal generator) 41.

The subtractor 41 generates a difference signal Sd (Sd= Smax−Smin) representing the difference between the maximum value signal Smax and the minimum value signal Smin. The generated difference signal Sd is supplied to a look-up table (also referred to as a reference table or a search table) 44.

The region pixel extractor 33, the maximum and minimum value extractor 37, and the subtractor 41 jointly make up a uniformity determining unit 29 for determining the uniformity of an image.

Figure 3:
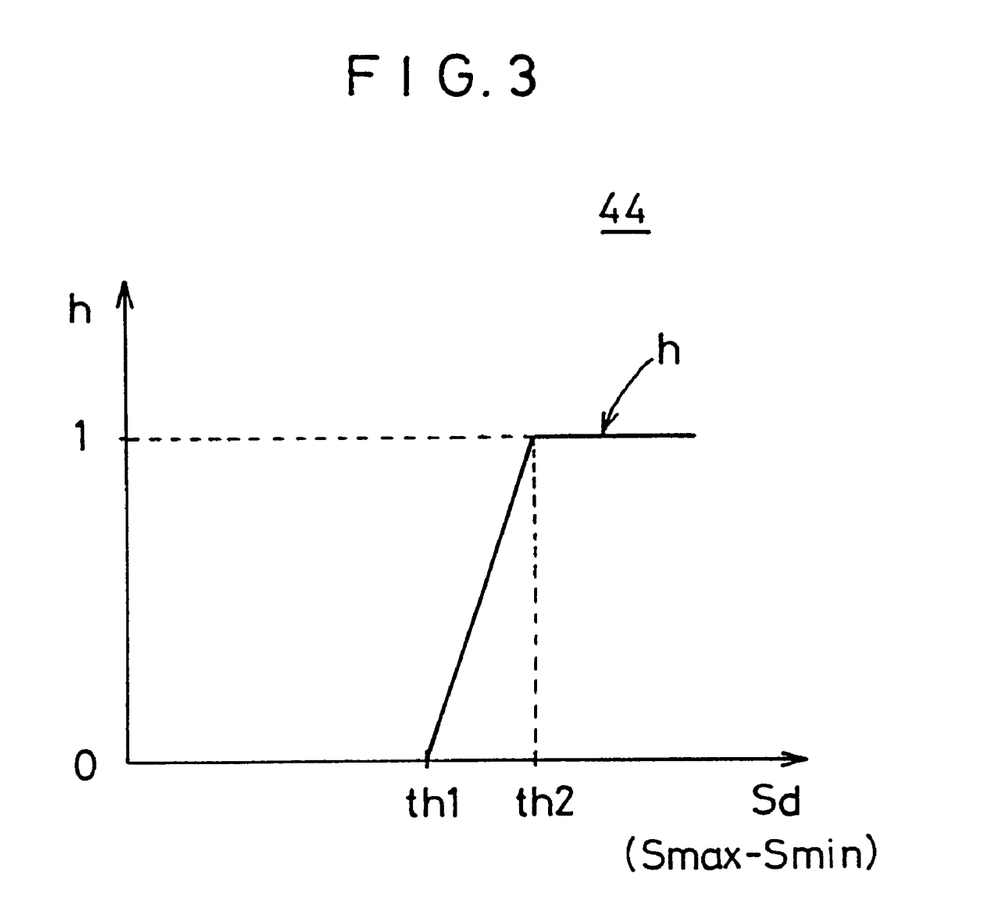
FIG. 3 is a diagram showing data of a look-up table in the sharpness enhancement processor shown in FIG. 2.

FIG. 3 shows data stored in the look-up table 44. In FIG. 3, the horizontal axis represents the difference signal Sd supplied as an input signal to the look-up table 44, and the vertical axis represents a coefficient (also called an enhancement coefficient) h which takes an output value ranging from 0 to 1. When the difference signal Sd is of a value smaller than a first threshold th1, the coefficient h is h=0, i.e., the look-up table 44 produces the coefficient h=0 as an output signal. When the difference signal Sd is of a value greater than the first threshold th1 and smaller than a second threshold th2, the coefficient h is of a value progressively greater from h=0 to h=1, i.e., the look-up table 44 produces the coefficient h proportional to the difference signal Sd as an output signal. When the difference signal Sd is of a value greater than the second threshold th2, the coefficient h is h=1, i.e., the look-up table 44 produces the coefficient h=1 as an output signal. The first and second thresholds th1, th2 are supplied from a port 46 to the look-up table 44, and can be changed in their values. The look-up table 44 may be regarded as a sharpness enhancement coefficient generator 43 for generating a sharpness enhancement coefficient depending on the uniformity of an image. The sharpness enhancement coefficient generator 43 also operates as an USM signal magnitude adjuster because it can adjust the magnitude of a USM signal (described later on) based on the uniformity of an image density.

The coefficient h outputted from the look-up table 44 depending on the difference signal Sd is supplied to a multiplier (product signal generator) 48, as shown in FIG. 2.

The subtractor 26 generates an unsharp masking (USM) signal S−U which represents the difference between the image signal S and the unsharp signal U, and supplies the generated unsharp masking signal S−U to a multiplier (product signal generator) 50. The unsharp masking signal S−U may also be calculated by calculating a Laplacian of the image signal S. For calculating a Laplacian of the image signal S. the unsharp signal generator 24 and the subtractor 26 may be replaced with a Laplacian generator as a secondary differential signal generator.

The multiplier 50 multiplies the unsharp masking signal S−U by a coefficient (also called a sharpness enhancement coefficient) k supplied from a port 52, thereby generating an unsharp masking signal (USM) signal k(S−U).

The multiplier 48 multiplies the unsharp masking signal k(S−U) by the coefficient h, thereby generating a new unsharp masking signal h·k(S−U), and supplies the generated new unsharp masking signal h·k(S−U) to the adder 28.

The adder 28 adds the unsharp masking signal h·k(S−U) to the image signal S, thereby generating a sharpness-enhanced signal S** represented by the equation (2) shown below, and outputs the generated sharpness-enhanced signal S* to an output port 54.

$$S^{**}=S+h\cdot k(S-U) \qquad (2)$$

In FIG. 2, the mask sizes Mu, M(m,n), the thresholds th1, th2,and the coefficient k supplied respectively from the ports 34, 35, 46, 52 are usually set to default values by a CPU (not shown). However, they may be set to desired values through an input device such as a keyboard by the user.

Default values for the mask sizes Mu, M(m,n), the thresholds th1, th2, and the coefficient k may be determined in advance by outputting an image from the output-unit 16 depending on the type of an image-carrying document, i.e., whether it is a reversal subject or a digital camera signal, the resolution of the image, or the type of the subject of the image. The determined default values may be stored in a ROM (Read-Only Memory).

Operation of the sharpness enhancement processor 20 will be described in detail below.

Figure 4:
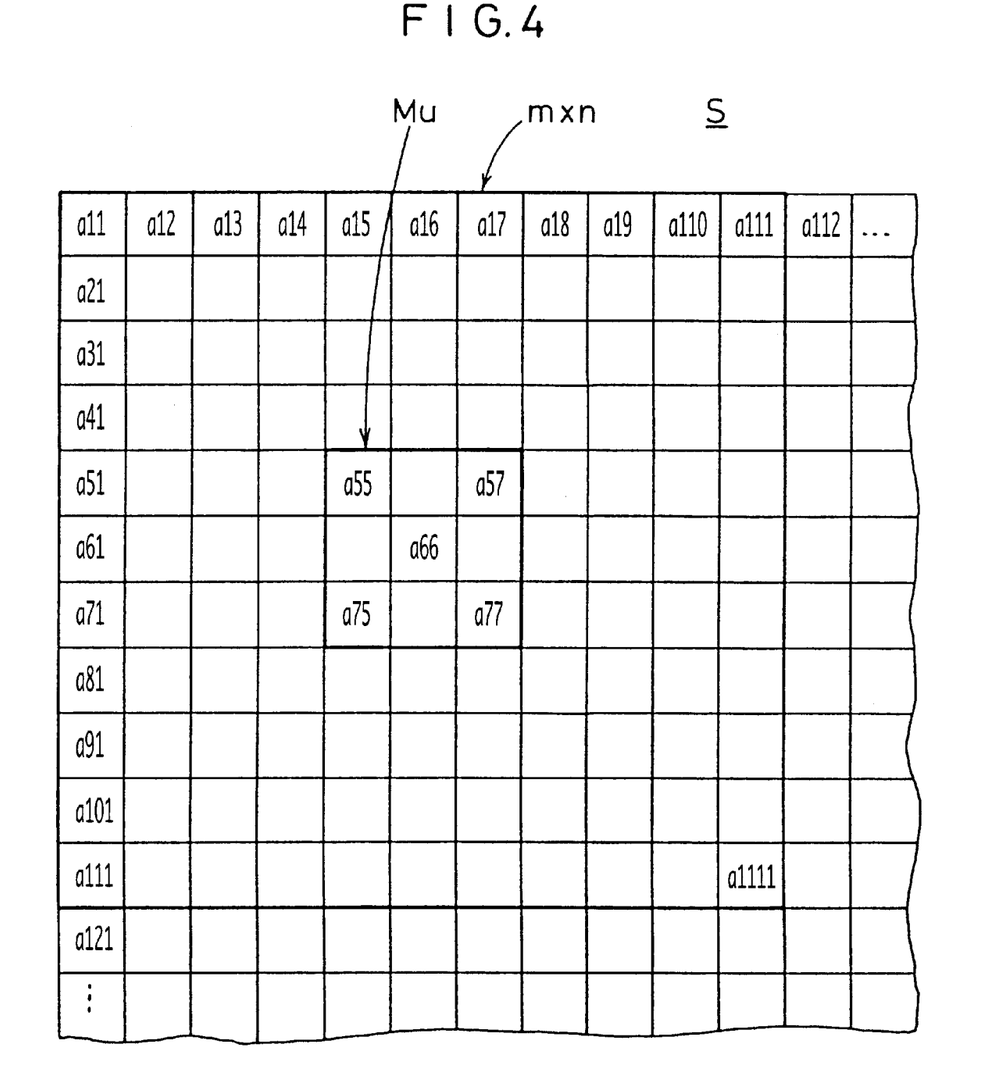
FIG. 4 is fragmentary diagram illustrative of pixel data of an image signal supplied to the sharpness enhancement processor shown in FIG. 2.

It is assumed that the image signal S comprises pixel data (data of an image broken up into pixels) as shown in FIG. 4. Optimum sharpness enhancement for a desired image signal S=a66 will be considered below. The image signal S shown in FIG. 4 schematically represents the image broken up into pixels (each of a square shape and having a size of about $\mu$m along each side).

If the mask size Mu for generating an unsharp signal U is set to Mu=3×3 pixels, then the unsharp signal generator 24 calculates the unsharp signal U as an average value, for example, of 9 pixel data comprising S =a55, a56, a57, a65, a66, a67, a75, a76, a77 disposed around the image signal S=a66 (including a66 itself).

Since the mask size M(m,n) is set to M(m,n)=11×11 pixels, the region pixel extractor 33 extracts 121 pixel data from a square region whose corners are represented by pixel data a11, a111, a111, a1111.

The maximum and minimum value extractor 37 extracts a maximum value signal Smax representing maximum pixel data and a minimum value signal Smin representing minimum pixel data from the 121 pixel data.

The subtractor 41 calculates a difference signal Sd representing the difference between the maximum value signal Smax and the minimum value signal Smin.

If the difference signal Sd is of a value smaller go than the first threshold th1, then the look-up table 44 produces the coefficient h=0 as an output signal. Since the unsharp masking signal (USM) signal k(S−U) is zero at this time, the sharpness-enhanced signal S** is equal to S*=S, and the sharpness enhancement processor 20 outputs an image signal free of sharpness enhancement. Specifically, if the difference signal Sd representing the difference between the maximum value signal Smax and the minimum value signal Smin is smaller than the first threshold th1, then it is determined that the image signal S represents a uniform image region, i.e., a region of uniform image density or a region of small density variations, and the image signal S is not sharpness-enhanced, so that a granular state and quantized steps will not be subject to sharpness enhancement. As a result, any surface roughness of an outputted image will be reduced.

If the difference signal Sd representing the difference between the maximum value signal Smax and the minimum value signal Smin is greater than the first threshold th1, then since the coefficient h is of a value exceeding 0 and ranging up to 1, the second term h·k(S−U) of the equation (2) representing the sharpness-enhanced signal S** has a finite value, and the image signal S is sharpness-enhanced. That is, if Sd>th1, then the image signal S is judged as representing a contrast region of the image, e.g., a texture region of the image, and is sharpness-enhanced. Therefore, the image region such as a texture region where the contrast is small is effectively sharpness-enhanced.

In this embodiment, as described above, the maximum value (maximum value signal Smax) and the minimum value (minimum value signal Smin) are extracted from the m×n pixel data from the mask size (predetermined range) M(m,n) around (near) the image signal S, and the uniformity of the image density is determined or evaluated on the basis of the difference (difference signal Sd) between the maximum and minimum values. Depending on the evaluated value (difference signal Sd), an image region whose contrast is small is sharpness-enhanced, and an image region including surface roughness or quantized steps is prevented from being sharpness-enhanced.

In FIG. 2, the uniformity of the image density is determined on the basis of the difference signal Sd representing the difference between the maximum value signal Smax and the minimum value signal Smin. However, the uniformity of the image density may be determined on the basis of a ratio between the maximum value signal Smax and the minimum value signal Smin, and if the ratio is of a value close to 1, then the image region may be judged as being of a uniform image density, and if the ratio is of a value which is spaced from 1 by a predetermined value, then the image region may be judged as being not of a uniform image density. In this manner, the coefficient h may alternatively be determined.

Consequently, the uniformity of the image density is determined by comparing the magnitudes of the maximum value signal Smax and the minimum value signal Smin in the image region made up of m×n pixels.

Figure 5:
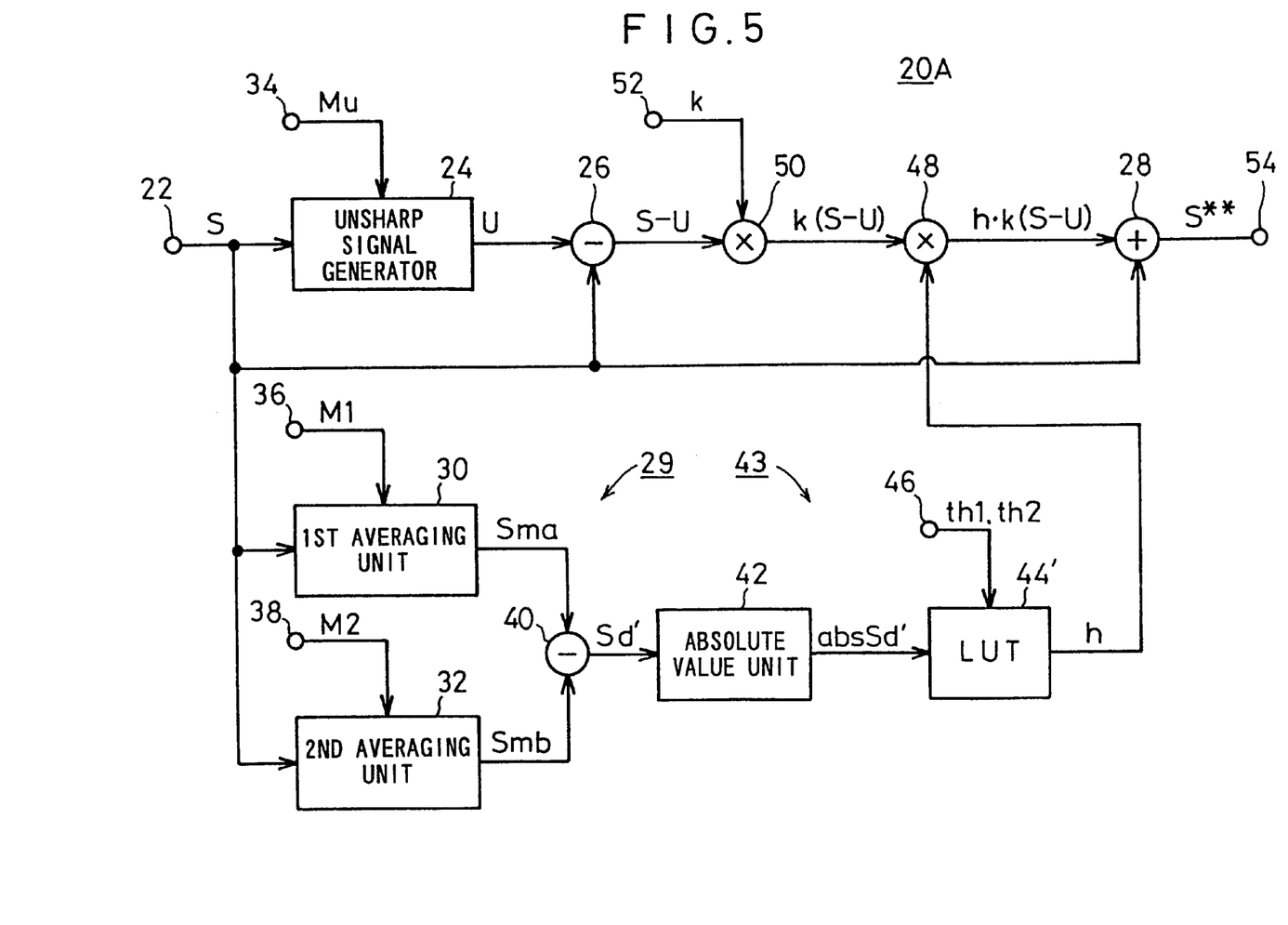
FIG. 5 is a block diagram of a sharpness enhancement processor according to another embodiment of the present invention.

FIG. 5 shows in block form a sharpness enhancement processor 20A according to another embodiment of the present invention. Those parts shown in FIG. 5 which are identical to those shown in FIG. 2 are denoted by identical or corresponding reference characters, and will not be described in detail below.

As shown in FIG. 5, an image signal (input image signal) S is supplied from an input port 22 to an unsharp signal generator 24, a subtractor (difference signal generator) 26, an adder (sum signal generator) 28, a first averaging unit (first average signal generator) 30, and a second averaging unit (second average signal generator) 32.

The first averaging unit 30 and the second averaging unit 32 generate signals Sma, Smb (first and second average signals Sma, Smb), respectively, representing averages of the image signal S based on respective mask sizes (two ranges of image signals around the image signal S) M1, M2 supplied from respective ports 36, 38, and supply the generated signals Sma, Smb to a subtractor 40. In this embodiment, the mask size M1 is selected to be of 5×5 pixels, and the mask size M2 is selected to be of 11×11 pixels. In view of the fact that color printing plates have different granularity values, the masks sizes M1, M2 may be of different values for each of the color printing plates.

In this embodiment, the image signal S is of a square shape and has a one-dot size, of about 5 $\mu$m along each side. The mask size M1 is of 25 $\mu$m along each side of a square shape, and the mask size M2 is of 55 $\mu$m along each side of a square shape. The blurring mask size Mu may be of an appropriate value independent of the mask sizes M1, M2. In this embodiment, the blurring mask size Mu corresponds to 3×3 pixels, i.e., is of 15 $\mu$m along each side of a square shape.

The subtractor 40 generates a difference signal Sd' (Sd'= Sma−Smb) representing the difference between the first average signal Sma and the second average signal Smb. An absolute value unit (also referred to as an absolute value signal generator or an absolute value calculator) 42 generates an absolute value signal absSd' (absSd'=|Sd'|=|Sma− Smb|) representing the absolute value of the difference signal Sd', and supplies the generated absolute value signal absSd' to a look-up table (also referred to as a reference table or a search table) 44'.

The first and second averaging units 30, 32, the subtractor 40, and the absolute value unit 42 jointly make up a uniformity determining unit 29 for determining the uniformity of an image.

Figure 6:
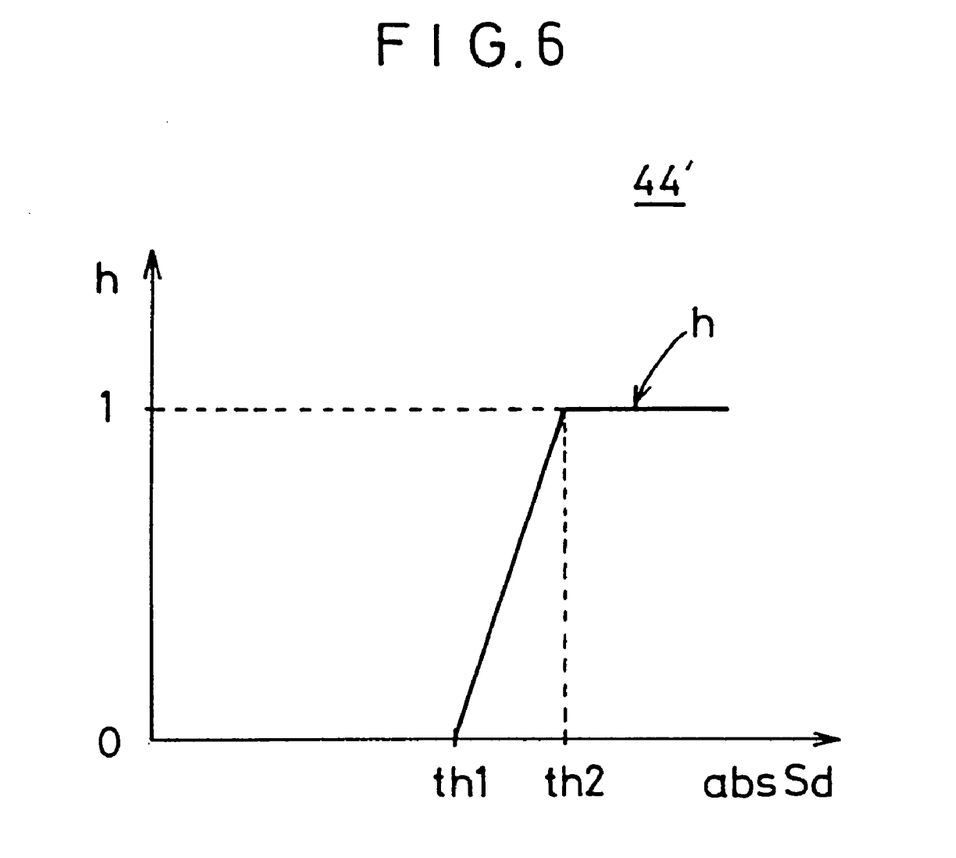
FIG. 6 is a diagram showing data of a look-up table in the sharpness enhancement processor shown in FIG. 5.

FIG. 6 shows data stored in the look-up table 44'. In FIG. 6, the horizontal axis represents the absolute value signal absSd' supplied as an input signal to the look-up table 44', and the vertical axis represents a coefficient (also called an enhancement coefficient) h which takes an output value ranging from 0 to 1. When the absolute value signal absSd' is of a value smaller than a first threshold th1, the coefficient h is h=0, i.e., the look-up table 44 produces the coefficient h=0 as an output signal. When the absolute value signal absSd' is of a value greater than the first threshold th1 and smaller than a second threshold th2, the coefficient h is of a value progressively greater from h=0 to h=1, i.e., the look-up table 44 produces the coefficient h proportional to the absolute value signal absSd' as an output signal. When the difference signal Sd is of a value greater than the second threshold th2, the coefficient h is h=1, i.e., the look-up table 44 produces the coefficient h=1 as an output signal. The first and second thresholds th1, th2 are supplied from a port 46 to the look-up table 44', and can be changed in their values. The look-up table 44' may be regarded as a sharpness enhancement coefficient generator 43 for generating a sharpness enhancement coefficient depending on the uniformity of an image. The sharpness enhancement coefficient generator 43 also operates as an USM signal magnitude adjuster because it can adjust the magnitude of a USM signal based on the uniformity of an image density.

The coefficient h outputted as depending on the absolute value signal absSd' from the look-up table 44' is supplied to a multiplier (product signal generator) 48, as shown in FIG. 5.

The multiplier 48 multiplies an unsharp masking signal k(S−U) by the coefficient h, thereby generating a new unsharp masking signal h·k(S−U), and supplies the generated new unsharp masking signal h·k(S−U) to the adder 28.

The adder 28 generates a sharpness-enhanced signal S represented by the equation (2) described above, and supplies the generated sharpness-enhanced signal S to the output port 54.

In FIG. 5, the mask sizes Mu, M1, M2, the thresholds th1, th2,and the coefficient k supplied respectively from the ports 34, 35, 46, 52 are usually set to default values by a CPU (not shown). However, they may be set to desired values through an input device such as a keyboard by the user.

Default values for the mask sizes Mu, M1, M2, the thresholds th1, th2, and the coefficient k may be determined in advance by outputting an image from the output unit 16 depending on the type of an image-carrying document, i.e., whether it is a reversal subject or a digital camera signal, the resolution of the image, or the type of the subject of the image. The determined default values may be stored in a ROM.

Figure 7:
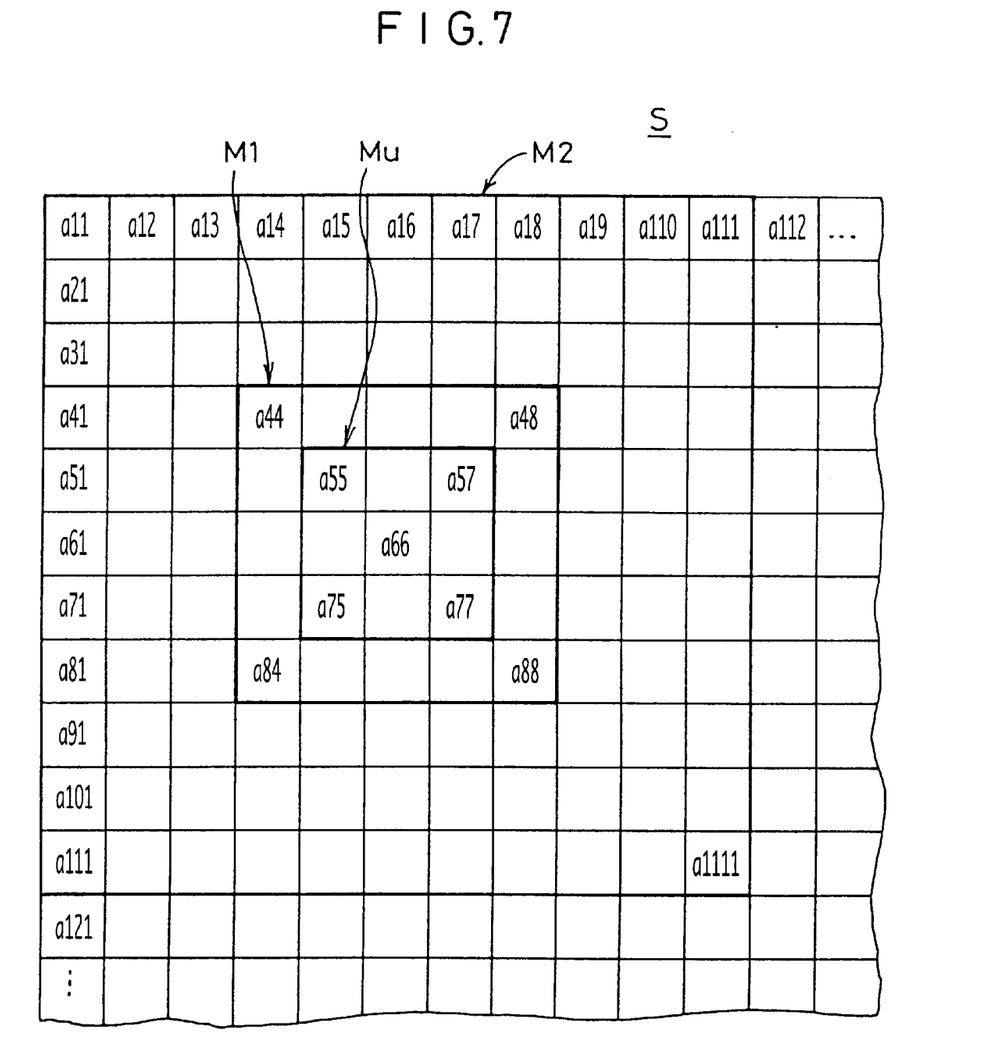
FIG. 7 is fragmentary diagram illustrative of pixel data of an image signal supplied to the sharpness enhancement processor shown in FIG. 5.

It is assumed that the input image signal S in FIG. 5 comprises pixel data (data of an image broken up into pixels) as shown in FIG. 7. Optimum sharpness enhancement for a desired image signal S=a66 will be considered below. The image signal S shown in FIG. 7 schematically represents the image broken up into pixels (each of a square shape and having a size of about $\mu$m along each side).

If the mask size Mu for generating an unsharp signal U is set to Mu=3×3 pixels, then the unsharp signal generator 24 calculates the unsharp signal U as an average value, for example, of 9 pixel data comprising S=a55, a56, a57, a65, a66, a67, a75, a76, a77 disposed around the image signal S=a66 (including a66 itself).

Since the mask size M1 is set to M1=5×5 pixels, the first averaging unit 30 calculates a first average signal Sma as an average of 25 pixel data from a square region whose corners are represented by pixel data a44, a48, a84, a88.

Since the mask size M2 is set to M1=11×11 pixels, the second averaging unit 32 calculates a second average signal Smb as an average of 121 pixel data from a square region whose corners are represented by pixel data a11, a111, a111, a1111.

The subtractor 40 and the absolute value calculator 42 calculates an absolute value signal absSd' representing the absolute value of the difference between the first average signal Sma and the second average signal Smb.

If the absolute value signal absSd' is of a value smaller than the first threshold th1, then the look-up table 44' shown in FIG. 6 produces the coefficient h=0 as an output signal. Since the unsharp masking signal (USM) signal k(S−U) is zero at this time, the sharpness-enhanced signal S is equal to S=S, and the sharpness enhancement processor 20A outputs an image signal free of sharpness enhancement. Specifically, if the absolute value signal absSd' representing the absolute value of the difference between the first average signal Sma and the second average signal Smb is smaller than the first threshold th1, then it is determined that the image signal S represents a uniform image region, i.e., a region of uniform image density or a region of small density variations, and the image signal S is not sharpness-enhanced, so that a granular state and quantized steps will not be subject to sharpness enhancement. As a result, any surface roughness of an outputted image will be reduced.

If the absolute value signal absSd' representing the absolute value of the difference between the first average signal Sma and the second average signal nmb is greater than the first threshold th1, then since the coefficient h is of a value exceeding 0 and ranging up to 1, the second term h·k(S−U) of the equation (2) representing the sharpness-enhanced signal S** has a finite value, and the image signal S is sharpness-enhanced. That is, if absSd' >th1, then the image signal S is judged as representing a contrast region of the image, e.g., a texture region of the image, and is sharpness-enhanced. Therefore, the image region such as a texture region where the contrast is small is effectively sharpness-enhanced.

In this embodiment, as described above, the uniformity of the image density is determined or evaluated on the basis of the difference between the average values calculated on the basis of the mask sizes M1, M2. An image region whose contrast is small is sharpness-enhanced, and an image region including surface roughness or quantized steps is prevented from being sharpness-enhanced.

In FIG. 5, the uniformity of the image density is determined on the basis of the difference between the average values calculated on the basis of the mask sizes M1, M2. However, the uniformity of the image density may be determined on the basis of a ratio between the average values calculated on the basis of the mask sizes M1, M2, and if the ratio is of a value close to 1, then the image region may be judged as being of a uniform image density, and if the ratio is of a value which is spaced from 1 by a predetermined value, then the image region may be judged as being not of a uniform image density. In this manner, the coefficient h may alternatively be determined.

Consequently, the uniformity of the image density is determined by comparing the magnitudes of the average values calculated on the basis of the mask sizes M1, M2.

With the former arrangement of the present invention, maximum and minimum values in a predetermined range close to an input image signal is determined, and the determined maximum and minimum values are compared with each other to evaluate the uniformity of the image density. Then, the magnitude of the USM signal is varied depending on the evaluated uniformity, and the varied USM signal is combined with the input image signal for thereby generating a sharpness-enhanced image signal.

With the latter arrangement of the present invention, average values in two ranges around an input image signal are determined, and the determined average values are compared with each other to evaluate the uniformity of the image density. Then, the magnitude of the USM signal is varied depending on the evaluated uniformity, and the varied USM signal is combined with the input image signal for thereby generating a sharpness-enhanced image signal.

Therefore, the uniformity of an image density can easily be determined, and the image signal can be sharpness-enhanced depending on the determined uniformity of the image density. It is possible to effect sharpness enhancement on an image region such as a texture region where the contrast is small, while preventing a granular state (surface roughness) and quantized steps from being sharpness-enhanced. As a result, the printing scanner can output high-quality images free of surface roughness and stripes like tone jumps.

Although certain preferred embodiments of the present invention have been shown and described in detail, it should be understood that various changes and modifications may be made therein without departing from the scope of the appended claims.

What is claimed is:

1. A method of enhancing image sharpness, comprising:
   generating an unsharp signal from an input image signal;
   generating an USM signal from the generated unsharp signal and said input image signal;
   determining the uniformity of an image density of the input image signal in a predetermined range near said input image signal;
   varying the magnitude of said USM signal depending on the determined uniformity; and
   combining said USM signal and said input image signal into a sharpness-enhanced image signal.

2. A method according to claim 1, wherein said step of determining the uniformity of the image density comprises the steps of:
   extracting maximum and minimum values in said predetermined range; and
   determining the uniformity of the image density based on the extracted maximum and minimum values.

3. A method according to claim 2, wherein said step of varying the magnitude of said USM signal comprises the steps of:
   determining the difference between said maximum and minimum values; and
   reducing the magnitude of said USM signal to zero if the difference between said maximum and minimum values is smaller than a predetermined threshold.

4. A method according to claim 2, wherein said step of varying the magnitude of said USM signal comprises the steps of:
   establishing a first threshold and a second threshold greater than said first threshold;
   determining the difference between said maximum and minimum values;
   reducing the magnitude of said USM signal to zero if the difference between said maximum and minimum values is smaller than said first threshold;
   progressively increasing the magnitude of said USM signal depending on said difference if said difference is greater than said first threshold and smaller than said second threshold; and
   setting the magnitude of said USM signal to a constant value if said difference is greater than said second threshold.

5. A method according to claim 1, wherein said step of determining the uniformity of the image density comprises the steps of:
   extracting maximum and minimum values in said predetermined range; and
   determining the uniformity of the image density based on a ratio between the extracted maximum and minimum values.

6. A method according to claim 1, wherein said predetermined range is selected depending on a color represented by said input image signal.

7. A method according to claim 1, wherein said step of determining the uniformity of the image density comprises the steps of:
   determining average values in two ranges for image signals around said input image signal; and
   determining the uniformity of the image density by comparing the determined average values with each other.

8. A method according to claim 7, wherein said step of determining the uniformity of the image density comprises the steps of:
   determining the absolute value of the difference between said aver age values; and
   reducing the magnitude of said USM signal to zero if the determined absolute value is smaller than a predetermined threshold.

9. A method according to claim 7, wherein said step of determining the uniformity of the image density comprises the steps of:
   establishing a first threshold and a second threshold greater than said first threshold;
   determining the absolute value of the difference between said average values;
   reducing the magnitude of said USM signal to zero if said absolute value is smaller than said first threshold;
   progressively increasing the magnitude of said USM signal depending on said absolute value if said absolute value is greater than said first threshold and smaller than said second threshold; and
   setting the magnitude of said USM signal to a constant value if said absolute value is greater than said second threshold.

10. A method according to claim 1, wherein said step of determining the uniformity of the image density comprises the steps of:
    determining average values in two ranges for image signals around said input image signal; and
    determining the uniformity of the image density based on a ratio between the average values.

11. A method according to claim 10, wherein said two ranges are selected depending on a color represented by said input image signal.

12. An apparatus for enhancing image sharpness, comprising:
    unsharp signal generating means for generating an unsharp signal from an input image signal;
    means for generating an USM signal from the generated unsharp signal and said input image signal;
    a uniformity determining unit for determining the uniformity of an image density of the input image signal in a predetermined range near said input image signal by extracting maximum and minimum values in said predetermined range, and determining the uniformity of the image density based on the extracted maximum and minimum values;

a USM signal magnitude adjuster for adjusting the magnitude of said USM signal depending on the determined uniformity; and means for combining said USM signal and said input image signal into a sharpness-enhanced image signal.

13. An apparatus according to claim 12, wherein said uniformity determining unit comprises means for determining the difference between said maximum and minimum values, and said USM signal magnitude adjuster comprises means for reducing the magnitude of said USM signal to zero if the difference between said maximum and minimum values is smaller than a predetermined threshold.

14. An apparatus according to claim 12, wherein said uniformity determining unit comprises means for establishing a first threshold and a second threshold greater than said first threshold and determining the difference between said maximum and minimum values, and said USM signal magnitude adjuster comprises means for reducing the magnitude of said USM signal to zero if the difference between said maximum and minimum values is smaller than said first threshold, progressively increasing the magnitude of said USM signal depending on said difference if said difference is greater than said first threshold and smaller than said second threshold, and setting the magnitude of said USM signal to a constant value if said difference is greater than said second threshold.

15. An apparatus according to claim 12, wherein said uniformity determining unit comprises means for selecting said predetermined range depending on a color represented by said input image signal.

16. An apparatus for enhancing image sharpness, comprising:

unsharp signal generating means for generating an unsharp signal from an input image signal;

means for generating an USM signal from the generated unsharp signal and said input image signal;

a uniformity determining unit for determining the uniformity of an image density of the input image signal in a predetermined range near said input image signal by determining average values in two ranges for image signals around said input image signal, and determining the uniformity of the image density by comparing the determined average values with each other;

a USM signal magnitude adjuster for adjusting the magnitude of said USM signal depending on the determined uniformity; and means for combining said USM signal and said input image signal into a sharpness-enhanced image signal.

17. An apparatus according to claim 16, wherein said uniformity determining unit comprises means for determining the absolute value of the difference between said average values, and reducing the magnitude of said USM signal to zero if the determined absolute value is smaller than a predetermined threshold.

18. An apparatus according to claim 16, wherein said uniformity determining unit comprises means for establishing a first threshold and a second threshold greater than said first threshold, and determining the absolute value of the difference between said average values, and said USM signal magnitude adjuster comprises means for reducing the magnitude of said USM signal to zero if said absolute value is smaller than said first threshold, progressively increasing the magnitude of said USM signal depending on said absolute value if said absolute value is greater than said first threshold and smaller than said second threshold, and setting the magnitude of said USM signal to a constant value if said absolute value is greater than said second threshold.

19. An apparatus according to claim 16, wherein said uniformity determining unit comprises means for selecting said two ranges depending on a color represented by said input image signal.

* * * * *